United States Patent Office 2,731,486
Patented Jan. 17, 1956

2,731,486

CATALYTIC HYDROGENATION OF CARBON MONOXIDE

Walter Rottig, Oberhausen Sterkrade-Nord, Germany, assignor to Ruhrchemie Aktiengesellschaft, Oberhausen-Holten, Germany, a joint-stock company of Germany No Drawing. Application December 6, 1949, Serial No. 131,517

Claims priority, application Germany December 23, 1948

5 Claims. (Cl. 260—449.6)

This invention relates to catalysts for use in the hydrogenation of carbon monoxide.

In carbon monoxide hydrogenation carried out at atmospheric pressure (synthesis at normal pressure), the use of iron catalysts is known. These catalysts nearly always contain, in addition to iron, small amounts of copper, and frequently also appropriate activators, for example calcium or zinc. In addition, catalysts of this type always show a relatively high alkali content, for example in the form of compounds of lithium or in the form of soda, sodium hydroxide, potassium hydroxide or potassium carbonate.

Iron catalysts of this type are prepared from solutions containing the iron and the activating metals in the form of soluble salts, especially in the form of nitrates. These solutions are heated at about 100° C. and added within as short a time as possible to a hot, preferably boiling, solution of alkali carbonate. Immediately after that the carrier substance (for example kieselguhr) is added to the solution and it is distributed therein as uniformly as possible by a stirrer rotating with high velocity. By an immediately following filtration the solid constituents are separated from the still hot solution. The alkali compounds remaining from the precipitating solution are removed by repeatedly washing out the filtrated substance with hot water. Then the catalyst substance is impregnated with a solution of the alkali salts employed and finally dried, formed and treated with reducing gases, preferably with hydrogen and/or carbon monoxide containing gases.

The quantity of alkali present, usually calculated as $K_2O$, also when the catalyst has been impregnated with compounds of other alkali metals, is of fundamental importance. If small quantities of alkali are used, for example 0.5–1%, calculated on the total content of iron metal (Fe), the proportion of high molecule hydrocarbons in the products is relatively small. On the other hand, the methane formation is fairly high. If the quantity of alkali is raised to 5%–10% $K_2O$, then there results an appreciably higher yield of high molecule hydrocarbons, whilst the methane formation decreases. These catalysts quickly become coated with paraffin during the reaction, and this results in a speedy reduction of their activity, and often necessitates the extraction of the catalysts at short intervals.

In catalytic carbon monoxide hydrogenation, particular importance is attached to a low content of high molecule hydrocarbons. It was found that this object can be achieved at normal pressure, or at a pressure only a few atmospheres higher, when iron catalysts are used, if the catalysts are impregnated with alkali salts, in particular potassium salts of pronounced acid characteristics, rather than with alkali hydroxide or alkali carbonate. Particularly good properties of the catalyst result when the impregnation of the catalysts is carried out by means of alkali silicate, primary alkali phosphate and/or primary alkali borate. By contrast, secondary phosphates are not suitable, since their acid component is not sufficiently pronounced, and therefore, if they are used for the impregnation of the catalysts, they cause a considerably higher formation of high molecule hydrocarbons.

If the impregnation of the catalysts is carried out by means of alkali silicate a $K_2O/SiO_2$ ratio in the region of approximately 1:3 to 1:6 is particularly advantageous. With an increase in the silicate components beyond this, the catalyst shows a marked decrease in activity. An increase of the alkali components in such a manner that for 1 part $K_2O$ there are precipitated less than 3 parts $SiO_2$, causes an appreciably stronger paraffin formation.

The iron catalysts according to the invention, under severe synthesis conditions, for example when working at the highest possible conversion rate by the use of appropriate reaction temperatures, show only a small paraffin formation; nevertheless, surprisingly enough, the methane formation also remains relatively low. Also, under less severe working conditions, no particularly large quantities of paraffin result. In these cases the methane formation decreases still further.

To obtain the highest possible yield of hydrocarbons of low boiling point, the molecular size of which lies, for example, between $C_5$ and $C_{12}$, the iron catalysts to be used according to the invention are, with advantage, reduced at relatively low temperatures, by means of hydrogen, and by the use of high gas velocities. The reduction temperatures are preferably chosen between 220° C. and 250° C. The gas velocities are from 1 to 1.5 meters per sec. An alteration of these reduction conditions produces iron catalysts which either have a lower activity, or cause an increased methane formation. If the reduction is effected by water gas instead of hydrogen, then, in that case the objectionable formation of high molecule hydrocarbons again increases.

The iron catalysts according to the invention are best prepared completely without, or with only a small content of the usual carrier substances (for example kieselguhr). For impregnation of iron catalysts carried out according to the invention there were used acid lithium, sodium or potassium salts of silicic acid, of orthophosphoric acid, of pyrophosphoric acid, of other polybasic phosphoric acids, of tungstic acid or of molybdic acids. Using potassium silicate the impregnation is to be carried out in such a way as to get a catalyst showing a $K_2O/SiO_2$ ratio of 1:3 up to 1:6.

The impregnation of the catalysts is carried out by treatment with suitable solutions of salts prior to reduction. Using solutions of acid alkali salts, for example of boric acid or of various phosphoric acids the precipitated and still moist catalyst substance is mixed as uniformly as possible with a suitable amount of this salt solution. This mode of procedure may also be practicable with alkali salts of silicic acid in case the salt solution employed shows the same $K_2O/SiO_2$ ratio which is intended for the ready catalyst. However technical alkali silicate solutions in this respect mostly contain an excess of alkali. This excess alkali is taken out after impregnation of the moist catalyst substance by neutralizing with an exactly measured amount of nitric acid, whereby this solution is separated from the catalyst substance by a following filtration.

*Example 1*

A catalyst consisting of 100 parts iron and 5 parts copper was precipitated hot, in known manner, from the appropriate nitrate solutions by means of soda solution. Immediately after the precipitation, the mother solution was filtered off, and the alkali still present in the filter cake was washed out with condensate water until there was a residual content of approximately 0.8% $K_2O$ (calculated as $K_2O$). The catalyst cake, still damp, was then impregnated with a water-glass solution containing approximately 3 parts $SiO_2$ per 1 part $K_2O$. After this impregnation, the damp catalyst mass, calculated on the total iron present, contained 25% $SiO_2$. The superfluous alkali was washed out by neutralization with dilute nitric acid and subsequent filtration, leaving a $K_2O/SiO_2$ ratio of 1:5.

The catalyst mass was next dried for 24 hours at 110° C. and then sieved to a particle size between 1 and 3 mm. The subsequent reduction was carried out by means of hydrogen at 225° C. for a reduction period of 60 minutes, at a gas-flow velocity of 1.2 meters per sec. The catalyst produced in this way had a reduction value of 30% free iron.

This catalyst was used, in a synthesis oven, for the conversion of water gas, in such a way that each part by volume of the catalyst was hourly contacted with 100 parts by volume of water gas at 220° C. In this way a conversion ($CO+H_2$) of 72%–74% was attained, corresponding to a 95%–98% carbon monoxide consumption. The methane formation approximated to 7%–8% of the total conversion. The consumption ratio ($CO/H_2$) amounted to approximately 1:0.7. The yield of $Nm^3$ of ideal gas reached 142 g. of synthesis products without methane.

In comparison with this, an iron catalyst, which had received, instead of a silicate impregnation according to the invention, a corresponding impregnation with KOH, attained a yield of 138 g. per $Nm^3$ of ideal gas. As a result of the high amount of free alkali, the conversion fell however, to 47%, whereupon an extraction was necessary to restore the full activity of the catalyst.

When the catalyst was impregnated according to the invention in such manner that it contained, at almost the same $K_2O/SiO_2$ ratio, only 1% alkali (calculated as $K_2O$), there then resulted, with approximately the same conversion, a methane formation of about 14%. The yield fell, in this instance, to 130 g. of synthesis product per $Nm^3$ of ideal gas. This yield was, however, maintained only at the beginning, since the methane formation, even after a relatively small running time, rose to about 15%–20%, whereupon the yield fell still more to 120 g. per $Nm^3$ of ideal gas.

When the catalyst was impregnated in such a way that there was a $K_2O/SiO_2$ ratio of 1:3, then the synthesis yielded larger quantities of high molecule hydrocarbons. Further, in this case, after a relatively short time an extraction of the paraffin coated catalyst was necessary.

When the catalyst according to the invention was reduced with water gas instead of hydrogen then, in this case also, there was an increased paraffin yield. Furthermore, the catalyst had a shorter life than when the reduction was carried out with hydrogen.

When the given amount of $SiO_2$ was increased, catalysts resulted, which, under similar working conditions, showed an appreciably reduced activity, so that the conversion fell to about 60%–63%.

*Example 2*

A catalyst comprising the composition as given in Example 1 was impregnated with primary potassium phosphate ($KH_2PO_4$) instead of alkali silicate in such a manner that it contained 1 part $K_2O$ per 100 parts of its content of iron (Fe). Reduction was carried out at 195° C. using a gas mixture containing 40% by volume of carbon monoxide and 50% by volume of hydrogen. The linear speed of the reduction gases amounted to 1.3 meters per sec. The reduction period was 60 minutes. The reduced catalyst contained 28% of free iron (Fe). The hydrogenation of carbon monoxide was carried out at 220° C. at atmospheric pressure using water gas containing 40% by volume of carbon monoxide (CO), 50.5% by volume of hydrogen ($H_2$), and 5% by volume of carbon dioxide ($CO_2$). 100 parts by volume of synthesis gas were passed hourly over 1 part by volume of catalyst.

In the synthetic process a conversion of 71% $CO+H_2$ was attained corresponding to a 93% carbon monoxide consumption. The carbon monoxide consumption was 0.69 part by volume per 1 part by volume of hydrogen. The yield of synthesis products, without methane, amounted to 140 g. per $Nm^3$ of ideal gas ($CO+H_2$).

*Example 3*

The iron catalyst as employed in Example 1 had received an impregnation with potassium borate ($KH_2BO_3$) in such a manner as to get 1.5 parts of $K_2O$ per 100 parts of its content of iron. The catalyst was reduced at 225° C. employing hydrogen, which was passed over the catalyst with a linear speed of 1.5 meters per sec. for 60 minutes. The reduced catalyst contained 25% of free iron (Fe). In the synthetic process each part by volume of the catalyst was hourly impacted with 100 parts by volume of water gas at 220° C. At these conditions a conversion ($CO+H_2$) of 72% was attained, corresponding to a 94% carbon monoxide conversion. 143 g. of synthesis products, without an insignificant formation of methane, were attained per $Nm^3$ of ideal gas ($CO+H_2$).

I claim:

1. In the method for the catalytic hydrogenation of carbon monoxide in which a high formation of relatively low-molecular weight hydrocarbons is produced along with a low formation of methane and high-molecular weight hydrocarbons, the improvement which comprises subjecting carbon monoxide to hydrogenation at a pressure not substantially in excess of normal in the presence of a precipitated iron catalyst of the contact type, said catalyst being impregnated with a polybasic acid whose hydrogen is partially replaced by an alkali metal to form an acid alkali metal salt of a polybasic acid, thereafter any excess alkali removed by neutralization and washing, and reduced with a reducing gas at reduction temperatures of 170–250° C. and at gas velocities of 1–1.5 meters per second, and recovering the resulting hydrocarbon product rich in low-molecular weight hydrocarbons.

2. Improvement according to claim 1 in which said acid alkali metal salt of a polybasic acid is a salt selected from the group consisting of primary alkali metal silicates, primary alkali metal phosphates, primary alkali metal borates, primary alkali metal tungstate and primary alkali metal molybdate.

3. Improvement according to claim 2, in which said catalyst is impregnated with 0.5–10% of said group member.

4. Improvement according to claim 1, in which said catalyst is impregnated with a silicate having a calculated $K_2O:SiO_2$ ratio of from about 1:3 to about 1:6.

5. Improvement according to claim 1 in which said catalyst is impregnated with a silicate having a calculated $K_2O:SiO_2$ ratio of greater than 1:3 and which has been neutralized with nitric acid to a $K_2O:SiO_2$ ratio of from about 1:3 to about 1:6 and from which the formed alkali nitrate has been washed.

References Cited in the file of this patent

UNITED STATES PATENTS

| | | |
|---|---|---|
| 1,844,963 | Larson | Feb. 16, 1932 |
| 2,254,806 | Michael | Sept. 2, 1941 |
| 2,257,457 | Fischer et al. | Sept. 30, 1941 |
| 2,276,693 | Heath | Mar. 17, 1942 |
| 2,287,891 | Linckh | June 30, 1942 |
| 2,365,094 | Michael et al. | Dec. 12, 1944 |
| 2,617,774 | Rottig et al. | Nov. 11, 1952 |
| 2,647,138 | Rottig | July 28, 1953 |